3,356,705
TRANS-DI(ALUMINOALKYL)CYCLOBUTANE
POLYMERS
Erich Marcus, Charleston, and Donald L. MacPeek, South Charleston, W. Va., assignors to Union Carbide Corporation, a corporation of New York
No Drawing. Filed June 28, 1963, Ser. No. 291,260
1 Claim. (Cl. 260—448)

The present invention is concerned with a novel process for the production of dialiphatic-substituted cyclobutanes, including polymeric organoaluminum compounds, utilizing trans-divinylcyclobutane and an isoalkylaluminum as initial reactants. The invention is also concerned with certain of the dialiphatic-substituted cyclobutanes, particularly the polymeric organoaluminum compounds and the higher molecular weight dienes, mono- and diepoxides, and iols hereinbelow described, as novel and useful composition of matter.

In accordance with this invention a trans-divinyl-cyclobutane, such as trans-1,2-divinylcyclobutane or trans-1,3-divinylcyclobutane, is initially reacted with an isoalkylaluminum so as to form a novel polymer comprised of a major proportion of recurring trans-di(aluminoethyl) cyclobutane units. This reaction can be represented by the partial equation:

I

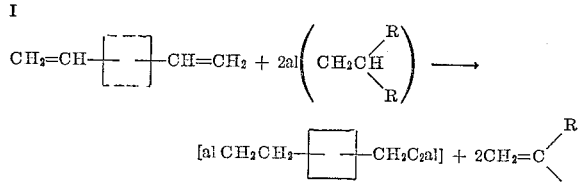

wherein each R, independently, designates an alkyl radical preferably containing from 1 to 4 carbon atoms. The trans-divinylcyclobutane can also be substituted on the cyclobutane nucleus by alkyl or cycloalkyl radicals.

It is to be noted that, as herein employed, the symbol "al" designates one-third of an atom of aluminum. Thus, in all instances, each aluminum atom is attached to three other atoms. In addition, it is to be noted that the di-aluminoethylcyclobutane containing polymer is also comprised of a minor amount of terminal aluminoalkane units derived, generally, from the isoalkylaluminum reactant. Minor amounts of other recurring and terminal units may also be present.

The isoalkylaluminums which can be reacted with trans-divinylcyclobutane as contemplated by this invention are the triisoalkylaluminums and diisoalkylaluminum hydrides represented by the formulas:

II

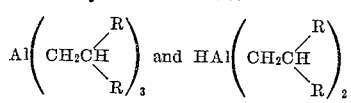

wherein R is as defined above. Suitable isoalkylaluminums include, by way of illustration, triisobutylaluminum, tri-2-methylbutylaluminum, tri-2-ethylhexylaluminum, diisobutylaluminum hydride, di-2-methylbutylaluminum hydride, di-2-ethylhexylaluminum hydride, and the like. The preferred isoalkylaluminum is triisobutylaluminum. Isoalkylaluminums containing two or three different isoalkyl radicals can also be employed as a reactant.

In producing the trans-di(aluminoethyl) cyclobutane containing polymer in accordance with this invention, the proportion of trans-divinylcyclobutane to isoalkylaluminum can vary broadly. Preferably, a proportion of from about 1 to about 5 moles of trans-divinylcyclobutane per mole of isoalkylaluminum is charged, although proportions outside this range can also be employed. In addition, when desired, an inert organic solvent can be incorporated in the reaction mixture. Suitable solvents include, for instance, heptane, octane, decane, benzene, toluene, xylene, decalin and the like.

The reaction temperature can vary broadly. Particularly good results can be obtained, for instance, in the range of from about 70° C. to about 200° C., substantially lower temperatures engendering an excessively slow rate of reaction, while at higher temperatures, undesirable side reactions may occur. More preferably, a reaction temperature of from about 90° C. to about 160° C. is employed. At such temperatures, the reaction is generally carried out for a period of from about 1 to about 10 hours. However, longer or shorter reaction periods sufficient to produce the desired polymer can also be employed.

It has also been found preferable, during the course of the reaction, to remove the isoolefin formed as a by-product. Concordant therewith, the reaction can be carried out in an open system under atmospheric pressure, or in a closed system under autogenous pressure, providing the system is equipped, in the latter instance, with means for venting or removing the by-product. The removal of by-product isoolefin serves to drive the reaction to completion and minimizes or eliminates side reactions between the isoolefin and the growing polymer.

The polymer thus obtained is ordinarily liquid at room temperature, and can be recovered from the reaction mixture in any convenient manner. For instance, the polymer can be recovered as the residue product obtained upon removal of the more volatile components of the reaction mixture by distillation or evaporation, etc.

When a polymer containing recurring trans-di(aluminoalkyl) cyclobutane units of higher molecular weight, i.e. increased aluminoalkyl chain length, is desired, the polymer obtained as described above is subsequently subjected to a "growth" process by reaction with ethylene in the absence of a catalyst, and preferably under pressure. This reaction, can be represented by the partial equation:

III

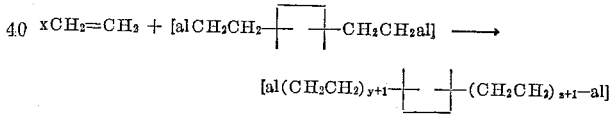

wherein y and z designate integers of from 0 to a positive value, at least one of which must be a positive value as a consequence of the reaction with ethylene; the sum of y plus z being equal to x, the number of moles of ethylene added per recurring unit of the polymer. Thus, in the "growth" process ethylene units are inserted between aluminum atoms and adjacent carbon atoms. A similar "growth" process will also occur in any minor amounts of other recurring units present in the polymer, as well as in terminal units. In addition, the "grown" polymer will contain a minor amount of recurring and terminal units which have not reacted with ethylene.

The amount of ethylene reacted should be sufficient to effect the "growth" of the recurring units of the polymer to the extent desired, as determined, for instance, by the subsequent use of the "grown" polymer. Useful polymers, by way of illustration, are those in which the aluminoalkyl chain length of the recurring units have "grown" by a statistically varying length of from 2, and preferably from 6, to about 32 carbon atoms, i.e. wherein y and z designate integers having a value of from zero to about 8, at least one of which has a positive value, the sum of which is preferably a value of at least 3. To this end, the polymer for which "growth" is desired is reacted with ethylene in a proportion of at least 1.5 moles, and preferably from about 4.5 moles, to about 24 moles of ethylene per atom of aluminum present in the polymer or per mole of isoalkylaluminum initially reacted to produce the polymer. In practice, however, an excess over the required amount of ethylene is generally charged. If desired, an inert organic solvent such as those described in connection with the initial polymer formation can also be incorporated in the reaction mixture.

The reaction temperature for the "growth" process can vary broadly. Particularly good results can be obtained for instance, in the range of from about 70° C. to about 200° C., substantially lower temperatures engendering an excessively slow rate of reaction, while at higher temperatures, undesirable side reactions may occur. More preferably, a reaction temperature of from about 80° C. to about 120° C. is employed, especially in connection with a batch operation. At such temperatures, the reaction is generally carried out for a period of from about 5 to about 50 hours. However, longer or shorter reaction periods consistent with the production of the "grown" polymer can also be employed. Thus, for instance, the reaction can also be carried out continuously in a tubular reactor at a temperature preferably of from about 120° C. to about 190° C. for very short contact periods. The amount of ethylene entering the polymer can be controlled in part by the control of temperature, reaction period, etc., and is readily determinable by one skilled in the art in light of this disclosure. Similarly, the reaction rate is controlled in part by the pressure, with pressures of from about 5,000 p.s.i. being preferred.

After the desired amount of ethylene has been incorporated in the polymer, as determined, for instance, by the moles of ethylene consumed, the system is vented so as to remove any excess ethylene. The "grown" polymer thus obtained, like its polymeric precursor, is ordinarily liquid at room temperature, and can be recovered from the reaction mixture in any convenient manner, as for instance, by the techniques described above in connection with the recovery of the ungrown polymer.

The "grown" polymer can be subjected to a "displacement" process by subsequent reaction with ethylene, preferably in the presence of an aluminum displacement catalyst and under pressure, to form a useful class of dienes, viz trans-di(omega-alkenyl)cyclobutanes.

This reaction can be represented by the partial equation:

IV

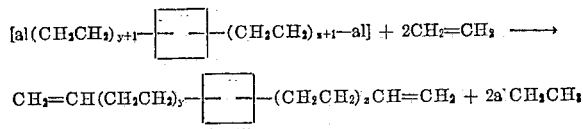

wherein $y$ and $z$ are as defined above. When $y$ or $z$ is zero, it is to be noted, the adjacent vinyl group is attached directly to the cyclobutane nucleus. A similar "displacement" process also occurs in any minor amounts of other recurring units present in the polymer as well as in terminal units.

In the "displacement" process, the polymer is reacted with ethylene in a proportion of at least 3 moles of ethylene per atom of aluminum present in the polymer. In practice, however, an excess over the required amount of ethylene is generally charged. If desired, an inert organic solvent such as those described above in connection with the initial polymer formation can also be incorporated in the reaction mixture. In addition, the presence of a small amount of a acetylenic compound, such as phenylacetylene, has been found to minimize the migration of double bonds in the diene product.

Suitable aluminum displacement catalysts are known in the art and include nickel, cobalt, and platinum. Such metals can be incorporated in the reaction mixture in elemental form, or preferably, as an inorganic or organic salt, such as nickel chloride, platinum chloride, cobalt chloride, nickel acetylacetonate, platinum acetylacetonate, cobalt acetylacetonate, and the like. The use of such salts ordinarily engenders a better dispersion of the metal in the reaction mixture. The catalyst is generally employed in a concentration of from about 0.0001 to about 1 percent by weight of metal based upon the weight of the polymer undergoing reaction, although higher or lower catalytic amounts can also be used. Preferably, the catalyst is employed in a concentration of from about 0.005 to about 0.1 percent by weight based in like manner.

The reaction temperature for the "displacement" process can also vary boardly, typically in the range of from about 25° C. to about 350° C. Particularly good results can be obtained in connection with a catalytic reaction in the range of from about 25° C. to about 200° C. Here again, substantially lower temperatures engender an excessively slow reaction rate, while at higher temperatures, in the presence of the catalyst, undesirable side reactions may occur. The more preferred catalytic reaction temperature is from about 40° C. to about 90° C. At such temperatures, the reaction is generally carried out for a period of from about 1 to about 24 hours. However, longer or shorter reaction periods consistent with diene formation can also be employed. The "displacement" process can also be conducted omitting the use of a catalyst at substantially higher reaction temperatures of up to about 350° C., or slightly higher, and preferably from 250° C. to about 320° C. At such higher temperatures, the reaction is best carried out continuously in a tubular reactor for short contact periods.

The diene product thus obtained is ordinarily liquid at room temperature and can be recovered from the reaction mixture by any of the conventional separation techniques described above. For instance, the product can be recovered as the residue obtained upon removal of the more volatile components of the reaction mixture by distillation. Alternatively, the reaction mixture can be hydrolyzed to assist the removal of alkylaluminum formed as a by-product. Hydrolysis can be effected by reaction with water, aqueous alcohol, and/or dilute acid. Upon hydrolysis, aluminum hydroxide is formed. The diene product can then be recovered by distillation of the organic phase of the reaction mixture. The removal of by-product alkylaluminum in this manner prevents the reversal of the "displacement" process which might otherwise occur upon distillation of the diene product.

Due to the nature of the polymer employed as precursor, the diene product may comprise an isomeric mixture of trans-di(omega-alkenyl)cyclobutanes of statistically varying molecular weight (alkenyl chain length). Such mixture can be resolved into components of narrow carbon content ranges by fractional distillation and the products isolated and analyzed by gas chromatography.

As typical of the trans-di(omega-alkenyl)cyclobutanes produced in accordance with this invention, there can be mentioned:

trans-1-(3-butenyl)-2-vinylcyclobutane,
trans-1-(3-butenyl)-3-vinylcyclobutane,
trans-1,2-di(3-butenyl)cyclobutane,
trans-1,3-di(3-butenyl)cyclobutane,
trans-1-(5-hexenyl)-2-vinylcyclobutane,
trans-1-(7-octenyl)-2-vinylcyclobutane,
trans-1-(3-butenyl)-2-(7-octenyl)cyclobutane,
trans-1-(5-hexenyl)-2-(7-octenyl)cyclobutane,
trans-1-(3-butenyl)-2-(5-hexenyl)cyclobutane,
trans-1,2-di(5-hexenyl)cyclobutane,
trans-1,3-di(5-hexenyl)cyclobutane,
trans-1-(9-decenyl)-2-vinylcyclobutane,
trans-1-(9-decenyl)-3-vinylcyclobutane,
trans-1,2-di(7-octenyl)vinylcyclobutane,
trans-1-(3-butenyl)-2-(11-dodecenyl)cyclobutane,
trans-1-(9-decenyl)-2-(5-hexenyl)cyclobutane,
trans-1-(11-dodecenyl) - 2 - (17-octadecenyl)cyclobutane, and the like.

The higher molecular weight dienes of Formula IV containing from 10, and preferably 14, to about 40 carbon atoms are contemplated as novel compositions of matter.

The trans-di(omega-alkenyl)cyclobutanes can subsequently be polymerized in accordance with conventional processes for the polymerization of olefinically unsaturated compounds to produce useful polymers. The trans-di(omega-alkenyl)cyclobutanes can also be reacted in accordance with conventional processes for the epoxidation of olefinically unsaturated compounds to produce the trans vicinal mono- and diepoxides represented by the formulas:

V
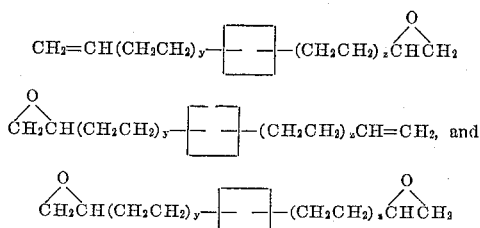

wherein y and z are as defined above.

The specific structure of the epoxide product will depend upon the trans-di(omega-alkenyl)cyclobutane precursor; the formation of a mono- or diepoxide being dependent, for the most part, upon the amount of epoxidizing agent employed, and readily determinable by one skilled in the art in light of this disclosure. Mixtures of mono- and diepoxides may also be produced depending, for instance, upon the amount of epoxidizing agent employed.

The epoxidation of the trans-di(omega-alkenyl)cyclobutanes can be carried out by reaction with peracetic acid or other conventional epoxidizing agent, in a suitable solvent such as ethylacetate, if desired, and at a temperature which can vary broadly in the range of from about —25° C. to about 150° C. Preferably, reaction temperatures of from about 10° C. to about 90° C. are employed. At such temperatures, a reaction period of from about 1 to about 10 hours is usually sufficient for a complete reaction. However, longer or shorter reaction periods consistent with epoxide formation can also be employed.

The epoxide product can then be recovered from the reaction mixture in any convenient manner. For instance, the epoxide product can be recovered as the residue obtained upon removal of the more volatile components of the reaction mixture by distillation or evaporation, and resolved, if desired, by further distillation when more than one epoxide is produced.

As typical of the trans vicinal mono- and diepoxides produced in accordance with this invention, there can be mentioned:

trans-1-(3,4-epoxybutyl)-2-(1,2-epoxyethyl)cyclobutane,
trans-1-(3,4-epoxybutyl)-2-vinylcyclobutane,
trans-1-(3-butenyl)-2-(1,2-epoxyethyl)cyclobutane,
trans-1,2-di(3,4-epoxybutyl)cyclobutane,
trans-1-(3,4-epoxybutyl)-3-(3-butenyl)cyclobutane,
trans-1-(3,4-epoxybutyl)-2-(5,6-epoxyhexyl)cyclobutane,
trans-1-(3,4-epoxybutyl)-2-(5-hexenyl)cyclobutane,
trans-1-(3-butenyl)-2-(5,6-epoxyhexyl)cyclobutane,
trans-1-(9,10-epoxydecyl)-2-vinylcyclobutane,
trans-1,2-di(7,8-epoxyoctyl)cyclobutane,
trans-1-(7,8-epoxyoctyl)-3-(7-octenyl)cyclobutane,
trans-1-(11,12-epoxydodecyl) - 2 - (3,4-epoxybutyl)cyclobutane,
trans-1-(11,12-epoxydodecyl)-2-(3-butenyl)cyclobutane,
trans-1-(11-dodecenyl)-2-(3,4-epoxybutyl)cyclobutane,
trans - 1 - (3,4-epoxybutyl) - 2 - (17,18-epoxyoctadecyl) cyclobutane,
trans - 1 - (3-butenyl) - 2 - (17,18-epoxyoctadecyl)cyclobutane,
trans-1-(3,4-epoxybutyl)-2-(17-octadecenyl)cyclobutane,
trans-1-(11,12-epoxydodecyl)-2-(17,18 - epoxyoctadecyl) cyclobutane,
trans-1-(11-dodecenyl)-2-(17,18 - epoxyoctadecyl)cyclobutane,
trans-1-(11,12-epoxydodecyl) - 2 - (17-octadecenyl)cyclobutane,
and the like.

The higher molecular weight epoxides of Formula V containing from 10, and preferably 14, to about 40 carbon atoms are contemplated as novel compositions of matter.

The trans vicinal mono-and diepoxides produced in accordance with this invention can be homopolymerized or reacted with organic hardeners such as polycarboxylic acids or anhydrides, polyamines, or polyols to produce curable resins having a wide variety of uses, particularly as molded articles. The resins thus obtained from the novel epoxides of this invention, particularly the diepoxides, may be characterized by enhanced impact strength and thermal shock resistance. The novel diepoxides of this invention can also be employed as plasticizers for vinyl resins. The novel monoepoxides of this invention, on the other hand, can be copolymerized with conventional vinyl monomers to produce resins having enhanced heat and/or light stability.

The polymers obtained in accordance with Equations I and III can also be converted to a useful class of diols, viz. the trans-di(omega-hydroxyalkyl)cyclobutanes represented by the formula:

VI
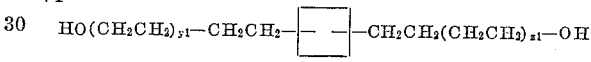

wherein $y^1$ and $z^1$ independently designate integers of from 0 to 8. The specific structure of the diols will depend upon the polymer employed as a precursor. Thus, the diols represented by Formula VI wherein $y^1$ and $z^1$ each designate zero are derived from the polymer obtained in accordance with Equation I; while the diols represented by Formula VI wherein $y^1$ and/or $z^1$ designate a positive integer are derived from the "grown" polymer obtained in accordance with Equation III, with $y^1$ and $z^1$ being equal to y and z respectively.

The conversion of the polymer to diol can be carried out by contacting the polymer at a temperature maintained in the range of from about 0° C. to about 150° C., and preferably from about 30° C. to about 60° C., with oxygen so as to insert an oxygen atom between each aluminum atom of the polymer and the adjacent carbon atom. Such contact can be effected, for instance, by passing dry air or a nitrogen-oxygen mixture into a reaction mixture containing the polymer. Since the reaction is exothermic, it is desirable in some instances to use a low concentration of oxygen at the beginning of the reaction and thereafter increase the oxygen concentration in the reactant gas stream as the rate of reaction decreases. Near the end of the reaction, pure oxygen can be used to insure completion. If desired, an inert organic solvent such as those described above in connection with the initial polymer formation can also be incorporated in the reaction mixture.

After the oxygenation step, water or dilute acid is added to the reaction mixture to convert the oxygenated polymer to the diol. Water is preferred, as it readily hydrolyzes the polymer, forming the mono- and diols and aluminum hydroxide as a by-product. Alternatively, the oxygenated polymer can be hydrolyzed by reaction with aqueous alcohol.

The diol thus obtained can be recovered from the reaction mixture in any convenient manner, as for instance, by distillation of the organic phase of the reaction mixture, etc. Moreover, due to the nature of the polymers employed as precursors, the product may comprise an isomeric mixture of trans-di(omega-hydroxyalkyl)cyclobutanes of statistically varying molecular weight (hydroxyalkyl chain length). Such mixture can be resolved into components of narrow carbon content ranges by fractional distillation and the products isolated and analyzed by gas chromatography.

As typical of the trans-di(omega-hydroxyalkyl)cyclobutanes produced in accordance with this invention, there can be mentioned:

trans-1-(4-hydroxybutyl)-2-(2-hydroxyethyl)cyclobutane,
trans-1-(4-hydroxybutyl)-3-(2-hydroxyethyl)cyclobutane,
trans-1,2-di(4-hydroxybutyl)cyclobutane,
trans-1-(2-hydroxyethyl)-2-(6-hydroxyhexyl) cyclobutane,
trans-1-(2-hydroxyethyl)-3-(6-hydroxyhexyl)cyclobutane,
trans-1-(2-hydroxyethyl)-2-(8-hydroxyethyl)cyclobutane,
trans-1-(2-hydroxyethyl)-3-(8-hydroxyoctyl)cyclobutane,
trans-1-(4-hydroxybutyl)-2-(8-hydroxyoctyl)cyclobutane,
trans-1-(6-hydroxyhexyl)-2-(8-hydroxyoctyl)cyclobutane,
trans-1-(4-hydroxybutyl)-2-(6-hydroxyhexyl)cyclobutane,
trans-1,2-di-(6-hydroxyhexyl)cyclobutane,
trans-1,3-di-(6-hydroxyhexyl)cyclobutane,
trans-1-(10-hydroxydecyl)-2-(2-hydroxyethyl) cyclobutane,
trans-1-(10-hydroxydecyl)-3-(2-hydroxyethyl) cyclobutane,
trans-1,2-di-(8-hydroxyoctyl)cyclobutane,
trans-1-(4-hydroxybutyl)-2-(12-hydroxydodecyl) cyclobutane,
trans-1-(10-hydroxydecyl)-2-(6-hydroxyhexyl) cyclobutane,
trans-1-(10-hydroxydecyl)-2-(8-hydroxyoctyl) cyclobutane,
trans-1-(12-hydroxydodecyl)-2-(6-hydroxyhexyl) cyclobutane,
trans-1-(4-hydroxybutyl)-2-(14-hydroxytetradecyl) cyclobutane,
trans-1-(4-hydroxybutyl)-2-(18-hydroxyoctadecyl) cyclobutane,
trans-1-(12-hydroxydodecyl)-2-(18-hydroxyoctadecyl) cyclobutane, and the like.

The higher molecular weight diols of Formula VI containing from 10, and preferably 14, to about 40 carbon atoms are contemplated as novel compositions of matter.

The trans-di(omega-hydroxyalkyl)cyclobutanes produced in accordance with this invention can be employed as organic hardeners by reaction with diepoxides, such as 3,4-epoxy-6-methylcyclohexylmethyl, 3,4-epoxy-6-methylcyclohexanecarboxylate, in conventional manner, to produce curable resins having a wide variety of uses, particularly as molded articles. The resins thus produced from the novel diols of this invention may be characterized by enhanced impact strength and thermal shock resistance.

The polymers obtained in accordance with Equations I and III can also be hydrolyzed by reaction with water, aqueous alcohol and/or dilute acid to form the trans-dialkylcyclobutanes represented by the formula:

VII

wherein $y^1$ and $z^1$ are as defined above. The products thus obtained can be recovered from the reaction mixture in any convenient manner, as for instance, by distillation of the organic phase of the reaction mixture. Moreover, due to the nature of the polymers employed as precursors, the hydrolyzed product may comprise an isomeric mixture of trans-dialkylcyclobutanes of statistically varying molecular weight (alkyl chain length). Such mixtures can be resolved into components of narrow carbon content ranges by fractional distillation and the products analyzed by gas chromatography.

Trans-dialkylcyclobutanes can also be obtained by the reaction with hydrogen of the trans-di(omega-alkenyl) cyclobutanes of Formula IV in accordance with conventional processes for the hydrogenation of olefinically unsaturated compounds.

The invention can be illustrated further by the following examples.

EXAMPLE I

In a one-liter flask equipped with a stirrer, thermometer, condenser, inlet tube and attachment to a Dry Ice trap, 113 grams of trans-1,2-divinylcyclobutane were added with stirring to 142 grams of triisobutylaluminum, over a period of about two hours, at a temperature maintained in the range of from 105° C. to 120° C. for a period of about 50 minutes and at a temperature of from 115° C. to 140° C. for an additional period of 10 minutes. During course of the ensuing reaction, 108 grams of isobutylene, formed as a by-product, were removed. A polymeric product comprised of recurring trans-1,2-di(aluminoethyl)cyclobutane units was formed. The polymer was hydrolyzed first with aqueous ethanol, then with water. The hydrolysate was steam distilled to yield a distillate comprised of an upper organic layer and a lower aqueous layer. The organic layer was separated, dried over magnesium sulfate, filtered, and distilled to yield 79 grams of trans-1,2-diethylcyclobutane boiling at a temperature in the range of from 110° C. to 115° C. The aqueous layer and the residue from the steam distillation were extracted with a petroleum ether (B.P. 35–37° C.) and combined with the residue from the distillation of the organic layer. Distillation of this material yielded an additional 6 grams of trans-1,2-diethylcyclobutane. The main cut (62 grams) of trans-1,2-diethylcyclobutane had the following physical properties: B.P. 114–115° C., $n_D^3$ 1.4096, $d_{30}^{30}$ 0.738. Literature: B.P. 115.5° C., $n_D^{20}$ 1.4128. Gas chromatography showed the presence of only one peak. In addition, the infrared spectrum and chromatographic retention time were identical with the properties of trans-1,2-diethylcyclobutane produced by the hydrogenation of trans-1,2-divinylcyclobutane over platinum oxide. In like manner, a polymeric product comprised of recurring trans-1,2-di(aluminoethyl)cyclobutane units is produced employing diisobutylaluminum hydride as the isoalkylaluminum reactant.

EXAMPLE II

In a manner similar to that described above in Example I, 450 grams of trans-1,2-divinylcyclobutane and 552 grams of triisobutylaluminum were brought into reactive admixture to produce 571 grams of a polymer comprised of recurring trans-1,2-di(aluminoethyl)cyclobutane units. A mixture of 160 grams of this polymer, and 182 grams of ethylene was charged to a stainless steel bomb under a nitrogen atmosphere. The bomb was closed and heated, accompanied by rocking, at a temperature maintained in the range of from 101° C. to 115° C. for a period of 3 hours, then at a temperature maintained in the range of from 120° C. to 126° C. for a period of 18 hours, whereupon the pressure within the bomb dropped from a high of 920 p.s.i. at 103° C. to 160 p.s.i. at 126° C. The bomb was vented at a temperature of 60° C. The reaction product, a "grown" polymer comprised of recurring trans-1,2-di(aluminoalkyl)cyclobutane units was hydrolyzed first with ethanol, then with aqueous hydrochloric acid. A large volume of water was added to the hydrolysate, which formed an upper organic layer and a lower aqueous layer. The organic layer was separated, washed with water, dried over magnesium sulfate, and distilled to yield the following fractions:

| Fraction | Weight (grams) | B.P. (° C.) | $C_n$ range |
|---|---|---|---|
| 1 | 22 | Up to 143°/atm | $C_6$–$C_8$ |
| 2 | 16 | 143°/atm.–117°/100 mm. Hg | $C_8$–$C_{10}$ |
| 3 | 64 | 117°/100 mm. Hg–175°/20 mm. Hg | $C_{10}$–$C_{15}$ |
| 4 | 37 | 175°/20 mm. Hg–165°/0.35 mm. Hg | $C_{15}$–$C_{20}$ |
| 5 | 38 | 165°/0.35 mm. Hg–255°/0.35 mm. Hg | $C_{20}$–$C_{28}$ |
| Residue | 28 | | |

The fractions were analyzed by gas chromatography and found to be comprised in major amount of trans-1,2-($C_4$-, $C_6$-, $C_8$-, $C_{10}$-, $C_{12}$-, $C_{14}$-, $C_{16}$-, $C_{18}$-, $C_{20}$-, $C_{22}$-, and $C_{24}$-dialkyl)cyclobutanes, i.e. cyclobutanes containing two alkyl substituents in trans-1,2 position, the substituents possessing an aggregate sum of 4, 6, 8, 10, 12, 14, 16, 18, 20, 22, and 24 carbon atoms.

EXAMPLE III

An ethylenically "grown" polymer obtained as described above in Example II is dissolved in benzene at a temperature of about 60° C., dry air is passed through the solution thereby oxygenating the polymer. Upon completion of the ensuing reaction, as evidenced by a cessation in the evolution of heat, water is added to the reaction mixture, accompanied by heating at a temperature of about 100° C., to hydrolyze the polymer. The precipitated aluminum hydroxide is removed by filtration. The filtrate is thereafter fractionally distilled. In this manner trans-1,2-($C_4$-, $C_6$-, $C_8$-, $C_{10}$-, $C_{12}$-, $C_{14}$-, $C_{16}$-, $C_{18}$-, $C_{20}$-, $C_{22}$-, and $C_{24}$-di[omega-hydroxyalkyl])cyclobutanes, i.e. cyclobutanes containing two omega-hydroxyalkyl substituents in the trans-1,2- position, the substituents possessing an aggregate sum of 4, 6, 8, 10, 12, 14, 16, 18, 20, 22, and 24 carbon atoms, are obtained as products. Upon similar reaction of the polymer obtained as described above in Example I, trans-1,2-di(2-hydroxyethyl)cyclobutane is obtained as a product.

EXAMPLE IV

In a manner similar to that described above in Example I, trans-1,2-divinylcyclobutane was reacted with triisobutylaluminum to produce a polymer comprised of recurring trans-1,2-di(aluminoethyl)cyclobutane units. A mixture of 260 grams of this polymer, and 300 grams of ethylene was charged to a stainless steel bomb under a nitrogen atmosphere. The bomb was closed and heated, accompanied by rocking, at a temperature maintained in the range of from 108° C. to 114° C. for a period of 38 hours, whereupon the pressure in the bomb dropped from a high of 1,520 p.s.i. to 425 p.s.i. An ethylenically "grown" polymer comprised of recurring trans-1,2-dialuminoalkyl)cyclobutane units was formed. The bomb was cooled and vented at a temperature of 70° C. To the contents of the bomb, 290 grams of additional ethylene, 345 grams of benzene, and 0.1 gram of nickel acetylacetonate were added at room temperature. The bomb was closed and reheated, accompanied by rocking, at a temperature maintained in the range of from 68° C. to 73° C. for a period of 19 hours, whereupon the pressure in the bomb dropped from a high of 825 p.s.i. to 450 p.s.i. The bomb was vented at a temperature of 40° C. and the reaction product was hydrolyzed, together with a benzene rinse, first with aqueous ethanol, then with water. A two-phase mixture comprising an upper organic layer and a lower aqueous layer was formed. The organic layer was separated, dried over calcium chloride, and distilled to yield the following fractions after the removal of lower boiling material:

| Fraction | Weight (grams) | B.P. (° C.) | Cn range |
|---|---|---|---|
| 1 | 76 | 80/atm.-90/200 mm. Hg | $C_8$ |
| 2 | 51 | 62/50 mm. Hg-70/5 mm. Hg | $C_8$-$C_{12}$ |
| 3 | 69 | 70/5 mm. Hg-105/1 mm. Hg | $C_{10}$-$C_{16}$ |
| 4 | 40 | 135/1 mm. Hg-200/1 mm. Hg | |
| 5 | 10 | 200/1 mm. Hg-210/1 mm. Hg | |
| 6 | 21 | 210/1 mm. Hg-240/0.3 mm. Hg | |
| Residue | 49 | | |

Fractions 1 to 3 were analyzed by gas chromatography and found to be comprised in major amount of trans-1,2-($C_4$-, $C_6$, $C_8$-, $C_{10}$- and $C_{12}$-di[omega-alkenyl])cyclobutanes, i.e., cyclobutanes containing two omega-alkenyl substituents in trans-1,2-position, the substituents possessing an aggregate sum of 4, 6, 8, 10 and 12 carbon atoms. Fractions 4 to 6 are comprised of higher molecular weight trans-1,2-di(omega-alkenyl)cyclobutanes containing an even number of carbon atoms, such as trans-1,2-($C_{14}$-, $C_{16}$-, $C_{18}$-, $C_{20}$-, $C_{22}$-, and $C_{24}$-di[omega-alkenyl])cyclobutanes.

A trans-1,2-($C_{12}$-di[omega-alkenyl])cyclobutane thus obtained, such as trans-1,2-di(5-hexenyl)cyclobutane, is converted to the corresponding diepoxide, viz. trans-1,2-di(5,6-epoxyhexyl)cyclobutane, by admixing the diene, in ethyl acetate, with an excess over two moles of peracetic acid per mole of diene and heating the resulting mixture at a temperature of about 60 °C. for a period of several hours. Upon using less than two moles of peracetic acid per mole of diene in an otherwise similar process, a mixture of trans-1-(5-hexenyl)-2-(5,6-epoxyhexyl)cyclobutane and trans-1,2-di(5,6-epoxyhexyl)cyclobutane is produced and subsequently resolved by distillation. In like manner, other trans-1,2-di(omega-alkenyl)cyclobutanes produced as described above in this example are converted to the corresponding mono- and diepoxides by reaction with peracetic acid.

What is claimed is:

The ethylenically grown polymer comprised of recurring units of the formula:

wherein al designates one-third of an atom of aluminum, y and z designate integers of from 0 to 8, at least one of which is a positive integer, said ethylenically grown polymer being produced by a process which comprises the steps of (a) bringing trans-divinylcyclobutane into reactive admixture with an isoalkylaluminum of the formula selected from the group:

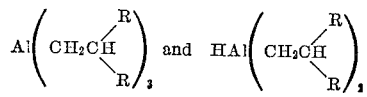

wherein each R, independently, designates an alkyl radical of from 1 to 4 carbon atoms, at a temperature of from about 70° C. to about 200° C., and while removing the isoolefin formed as a by-product from the resulting mixture, for a period of time sufficient to produce a polymer comprised of recurring units of the formula:

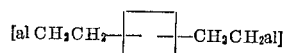

and (b) bringing said polymer into reactive admixture with at least 1.5 moles of ethylene per aluminum atom of said polymer, in the absence of a catalyst, at a temperature of from about 70° C. to about 200° C., for a period of time sufficient to produce said ethylenically grown polymer.

References Cited

UNITED STATES PATENTS

| | | | |
|---|---|---|---|
| 3,035,077 | 5/1962 | Johnson et al. | 260—448 |
| 3,136,667 | 6/1964 | D'Alelio | 260—448 X |
| 2,977,381 | 3/1961 | Roha et al. | 260—448 |
| 3,069,450 | 12/1902 | Attwood et al. | 260—448 |
| 3,100,219 | 8/1963 | Koster et al. | 260—448 |
| 3,052,737 | 9/1962 | Slaugh | 260—666 |
| 3,082,265 | 3/1963 | Arrigo | 260—666 |
| 2,917,549 | 12/1959 | Hasek et al. | 260—617 |
| 2,936,324 | 5/1960 | Hasek et al. | 260—617 |
| 3,019,234 | 1/1962 | Korach | 260—348 |
| 3,078,280 | 2/1963 | Ploetz et al. | 260—348 |

TOBIAS E. LEVOW, *Primary Examiner.*

NICHOLAS S. RIZZO, *Examiner.*

N. S. MILESTONE, H. M. S. SNEED,
*Assistant Examiners.*

UNITED STATES PATENT OFFICE
CERTIFICATE OF CORRECTION

Patent No. 3,356,705              Dated     December 5, 1967

Inventor(s) Erich Marcus and Donald L. McPeek

It is certified that error appears in the above-identified patent and that said Letters Patent are hereby corrected as shown below:

Column 1, lines 30-35, the first appearing formula should read -- $\left[ alCH_2CH_2 - \boxed{\phantom{x}} - CH_2CH_2al \right]$ --. Column 3, line 63, "a" should read --an--. Column 4, line 7, "boardly" should read --broadly--. Column 7, line 12, "8-hydroxyethyl" should read --8-hydroxyoctyl--.

Signed and Sealed this second Day of September 1975

[SEAL]

Attest:

RUTH C. MASON
*Attesting Officer*

C. MARSHALL DANN
*Commissioner of Patents and Trademarks*